(12) United States Patent
Jones et al.

(10) Patent No.: US 8,170,855 B2
(45) Date of Patent: May 1, 2012

(54) SYSTEM FOR SIMULATING PET GANTRY (75) Inventors: William Jones, Knoxville, TN (US);
John E. Breeding, Knoxville, TN (US);
Johnny H. Reed, Clinton, TN (US);
Jimmy Everman, Maryville, TN (US);
Michael E. Casey, Louisville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1038 days.

(21) Appl. No.: 12/110,485

(22) Filed: Apr. 28, 2008

(65) Prior Publication Data

US 2008/0275688 A1 Nov. 6, 2008

Related U.S. Application Data (60) Provisional application No. 60/914,420, filed on Apr. 27, 2007, provisional application No. 60/984,062, filed on Oct. 31, 2007.

(51) Int. Cl.
*G06F 17/50* (2006.01)
(52) U.S. Cl. ........................................................ 703/13
(58) Field of Classification Search .................. 703/13
See application file for complete search history.

(56) References Cited

U.S. PATENT DOCUMENTS

2005/0253075 A1* 11/2005 Jones et al. .............. 250/363.04

OTHER PUBLICATIONS

Binkley et al.: An Electronic Detector Simulator for Testing Position, Energy, and Timing Spectral Performance of Detector Electronics 0-7803-4258-5/98/$10.00 0 1998 IEEE; pp. 666-670; 1998.*
Jones et al.: First Time Measurement of Trans axial Resolution for a New High-Sensitivity PET Prototype Using 5 LSO Panel Detectors; IEEE; pp. 694-698; 2003.*
Musrock et al.; Performance Characteristics of a New Generation of Processing Circuits for PET Applications; pp. 974-978; IEEE Transactions on Nuclear Science, vol. 50, No. 4, Aug. 2003.*
Zaidi et al.; Implementation of an environment for Monte Carlo simulation of fully 3-D positron tomography on a high-performance parallel platform; Parallel Computing 24 (1998) 1523±1536.*
Jones et al.; Fast and Accurate Nearest-Neighbor 3-D LOR Rebinning: the PDR Card Applied to a Rotating 5-Head LSO-Panel-Detector PET Prototype; 2005 IEEE Nuclear Science Symposium Conference Record; pp. 2259-2263.*

* cited by examiner

*Primary Examiner* — Hugh Jones
(74) *Attorney, Agent, or Firm* — Peter Kendall (57) ABSTRACT A system for simulating a Positron Emission Tomography (PET) gantry has a computer system having a bus system for receiving expansion cards, a mass data storage support system, the mass storage system being operable to store coincidence-event and tag packet data, and a data transfer simulation card for said bus system, wherein the data transfer simulation card is operable to simulate transfer timing of the stored coincidence-event and tag packet data.

18 Claims, 7 Drawing Sheets

SYSTEM FOR SIMULATING PET GANTRY

CROSS-REFERENCE TO RELATED APPLICATIONS

This application claims priority to U.S. provisional applications No. 60/984,062 filed Oct. 31, 2007 and 60/914,420 filed Apr. 27, 2007 which are hereby incorporated by reference in their entirety.

TECHNICAL FIELD

The technical field of the present application relates to positron emission tomography (PET) systems and their data acquisition, in particular, to the development of data acquisition and processing systems.

BACKGROUND

Positron Emission Tomography (PET) is a nuclear medicine medical imaging technique which produces a three-dimensional image or map of, for example, functional processes in the body. The system detects pairs of gamma rays emitted indirectly by a positron-emitting radioisotope, which is introduced into the body on a metabolically active molecule. Images of metabolic activity in space are then reconstructed by computer analysis. Scanners may be aided by results from a CT X-ray scan performed at the same time in the same machine.

One of the many challenging aspects of developing positron emission tomography (PET) instrumentation is the thorough validation of coincidence-event data acquisition systems. The multiple random processes at work in the PET portion of PET/CT make for unusually subtle problems in electronic data acquisition. These random processes are difficult to reproduce without actually using an expensive array of PET detectors and physically handling radio-active sources. These challenging processes include: random order of packet arrival (emission in random 3-D directions by the always-180-degree-opposed gamma pairs), random arrival times of coincidence-event packets (Poisson-distributed), and dynamically changing rates of packet arrival (biological movement, e.g., cardiac and respiratory and nuclear half-life of injected tracers such as F-18, Rb-82.) Often, there is the added health burden to personnel due to the frequent handling of these sources. This handling is perhaps more easily accepted when an actual patient is involved but harder to bear when repeatedly loading "phantom" source containers just to validate a minor change in the "under-test" PET data acquisition system. Obviously, the non-trivial capital investment required of current PET/CT equipment means there is seldom any supplemental access to real PET detector arrays for the purpose of development and test. In total, these technical and fiscal challenges tend to significantly slow the rate of advancement to the state of the art in PET.

SUMMARY

According to an embodiment, a system for simulating a Positron Emission Tomography (PET) gantry, may comprise a computer system having a bus system for receiving expansion cards; a mass data storage support system, the mass storage system being operable to store coincidence-event and tag packet data; and a data transfer simulation card for said bus system, wherein the data transfer simulation card is operable to simulate transfer timing of said stored coincidence-event and tag packet data.

According to a further embodiment, the mass data storage support system may be a redundant array of inexpensive disks (RAID). According to a further embodiment, the mass storage system may comprise one or more solid state hard disk. According to a further embodiment, the data transfer simulation card may comprise an output interface selected from the group consisting of Fibre Channel, G-LINK, TAXI, and fiber optic transceivers. According to a further embodiment, the fiber optical transceivers may form a PETLINK™ interface. According to a further embodiment, the data transfer simulation card may comprise a field programmable gate array (FPGA) programmed to operate as a router. According to a further embodiment, the data transfer simulation card may further comprise a FIFO buffer coupled with said FPGA router and a bus system interface circuit coupled to said FPGA router. According to a further embodiment, the bus system can be a PCI bus. According to a further embodiment, the system may further comprise a cross-point switch coupled between an output interface and said FPGA router. According to a further embodiment, the system may further comprise a trigger system that initiates a periodic stored coincidence-event and tag packet data. According to a further embodiment, the data transfer simulation card may further comprise a pseudo-random number generator and a comparator for comparing a random number with a probability value. According to a further embodiment, the comparator may generate an output signal that triggers a stored coincidence-event and tag packet data. According to a further embodiment, the computer system may be selected from the group consisting of personal computer (PC), server PC, laptop computer.

According to another embodiment, a method for simulating the data output of a Positron Emission Tomography (PET) gantry, may comprise the steps of storing coincidence-event and tag packet data in a mass data storage system; reading said coincidence-event and tag packet data; and outputting said coincidence-event and tag packet data via a selected output interface using a pre-selected timing characteristic.

According to a further embodiment, the pre-selected timing characteristic may use a pre-selected delay value. According to a further embodiment, the pre-selected timing characteristic may use a varying probability value for packet delays. According to a further embodiment, the varying probability value may be generated by a pseudo-random number generator (PRNG). According to a further embodiment, the PRNG may simulate a Poisson timing. According to a further embodiment, the PRNG may be a Lagged Fibonacci Pseudo Random Number Generator. According to a further embodiment, the coincidence-event and tag packet data may comprise a data field for an elapsed time. According to a further embodiment, the data field in the coincidence-event and tag packet data to be stored may be overwritten by a delay or probability value. According to a further embodiment, the coincidence-event and tag packet data may be output by means of a field programmable gate array (FPGA).

According to yet another embodiment, a system for simulating the data output of a Positron Emission Tomography (PET) gantry may comprise a mass data storage system for storing coincidence-event and tag packet data; means for reading said coincidence-event and tag packet data; and means for outputting said coincidence-event and tag packet data via a selected output interface using a pre-selected timing characteristic.

According to a further embodiment, the pre-selected timing characteristic may use a pre-selected delay value. According to a further embodiment, the pre-selected timing characteristic may use a varying probability value for packet delays.

According to a further embodiment, the varying probability value may be generated by a pseudo-random number generator (PRNG). According to a further embodiment, the PRNG may simulate a Poisson timing by a Lagged Fibonacci Pseudo Random Number Generator. According to a further embodiment, the coincidence-event and tag packet data may comprise a data field for an elapsed time. According to a further embodiment, the data field in the coincidence-event and tag packet data to be stored may be overwritten by a delay or probability value. According to a further embodiment, the means for outputting may be a field programmable gate array (FPGA).

Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any preceding claimed embodiment(s).

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain, by way of example, the principles of the invention.

DETAILED DESCRIPTION

Figure 1:
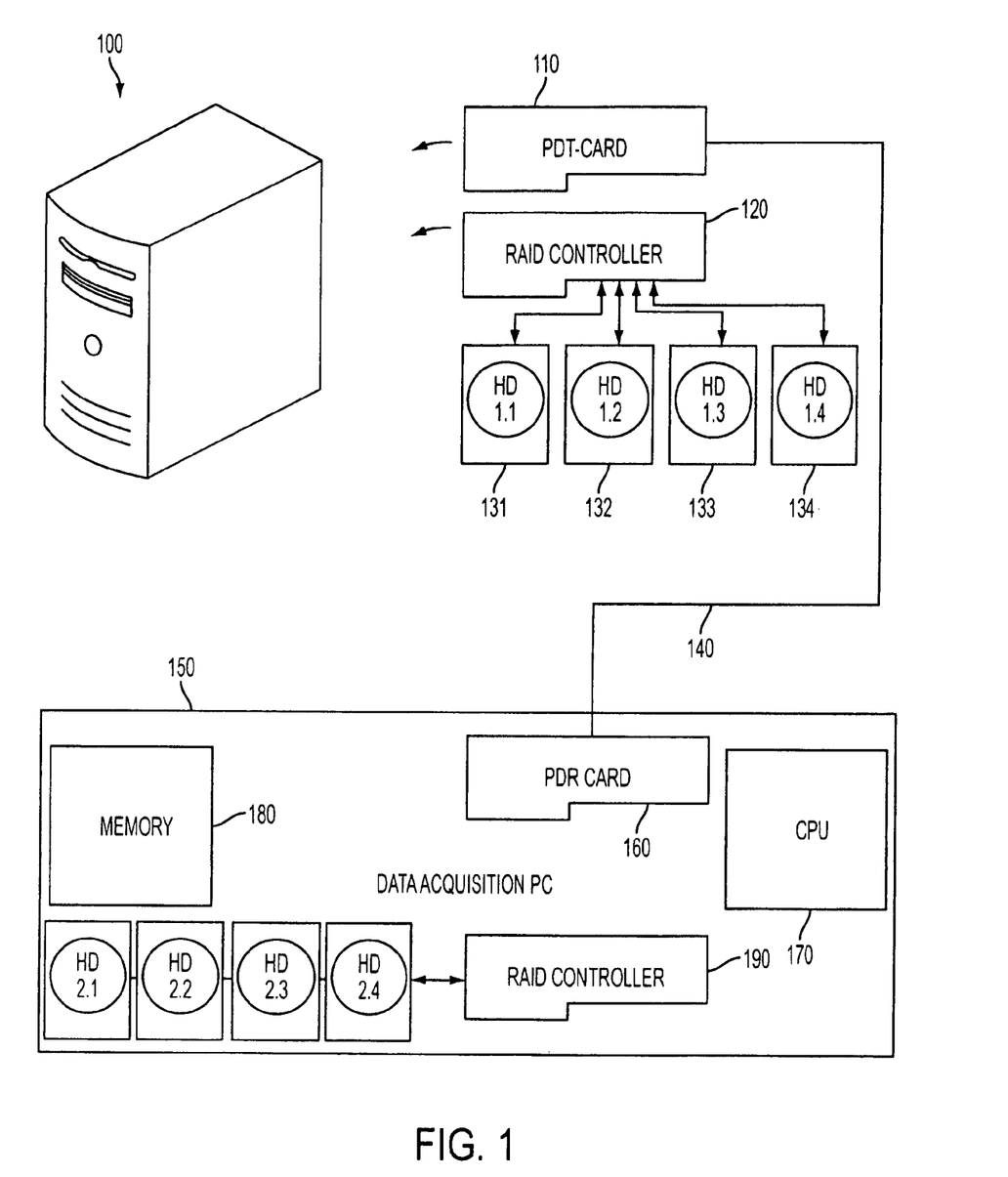
FIG. 1 is a block diagram showing a PET gantry simulating computer system coupled with a data acquisition development system.

FIG. 1 is a system block diagram showing a computer system 100 as a substitute for a PET/CT during test and/or development of PET data acquisition and processing systems. As shown in FIG. 1, this system can be implemented in a personal computer (PC), server-class PC, or a laptop PC using bus expansion technology such as a PCI bus expansion chassis. In this specification, such a system is called the PET Gantry Simulator PC. The PET Gantry Simulator PC mimics the random nature of a coincidence-event stream from a PET detector array and may primarily aid the development, testing and validation of PET data acquisition systems. The system 100 may use a conventional server-class PC running for example, Windows XP or Unix having any type of PCI bus system for receiving extension cards. However, in other embodiments, other types of extension cards may be used. This Gantry Simulator PC contains a conventional RAID disk system 120, such as a "RAID 0" file system, for fast read access into large files stored on a RAID array 131-134. However, according to other embodiments, other disk arrays or high speed disk systems may be used. For example, solid state hard disks are getting readily available and may substitute conventional hard disks. Solid state hard disks may also provide improved access and transfer timing. According to an embodiment, as shown in FIG. 1, extension card 110 is a custom-designed PETLINK™ direct memory access (DMA) transceiver (PDT) card. The PDT card 110 may include fiber optics and a PCI interface. The fiber-optic output 140 from this PDT-in-Gantry-Simulator effectively reproduces, in several important ways, the coincidence-detection data-stream output of many types of real PET detector arrays. Significantly, this PETLINK™-compatible fiber-optic retransmission of PET data (real or synthetic) can be repeated exactly and endlessly according to various embodiments.

Typically, real 64-bit PET coincidence-event and tag packet data, i.e. data collected previously in list mode form, are initially loaded onto this RAID. Under control of a Windows or Unix based custom application code, this data can be read from the RAID disk system 131-134. These data can then be input to the PDT card 110 via the PCI bus, and retransmitted from the PDT card 110 via fiber optic cables 140 at controlled rates to a PET data acquisition and processing development system 150. The development system may be any type of PC, in particular, a server-class PC having a CPU 170, memory 180, and a disk system 190. For receiving the simulated data output of the Gantry simulator PC 100 via link 140, the development system may comprise a custom designed PETLINK™ DMA rebinner (PDR) card 160 as disclosed for example, in U.S. Patent Application 2005/0253075 which is hereby incorporated by reference in its entirety.

The rates of packet re-transmission between the Gantry Simulator PC 100 and the development system 150 can either be set to mimic that of the original PET acquisition or can be arbitrarily modified to conform to other desired scenarios. According to various embodiments, a constant rate, bolus injections, half-life decay, etc. may be simulated by Gantry Simulator PC 100. For example, various rates of packet re-transmission may typically only be updated by the PDT card 110 with each passing millisecond. According to one embodiment, in one operational mode, the PDT card 110 can be set to mimic even the Poisson distribution of the individual time delays between consecutive retransmitted coincidence-event packets. The effective range of packet transmission rates for the Gantry Simulator system 100 may approach a low of 1 kHz and a high of 1 to 8 MHz or more.

Instead of delivering the fiber-optic output from the PET coincidence processor of a conventional PET/CT system to the PET acquisition system, the fiber-optic delivery comes from the PET Gantry Simulator PC 100. As stated above, this Gantry Simulator PC 100 may include an off-the-shelf "RAID 0" file system 120, 131-134 or equivalent fast storage system which primarily supports rapid read access to list-mode data tiles. These list-mode files can be selected from most any type of previously recorded real-PET data.—e.g., F-18 whole body, Rb-82 cardiac gating, multi-frame dynamic. etc.—which are collected as "raw" 64-bit detector-pair event packets, including millisecond time-tag packets may be stored in the RAID file system. According to other embodiments, in addition, synthetically generated list-mode files or even real-PET list-mode files with arbitrarily-defined count rate profiles may also be stored in the Gantry Simulator PC 100. During simulation, such a list-mode file is read from the RAID 120, 131-134, transferred via DMA into the PETLINK™ DMA Transceiver (PDT) card 110, and then retransmitted via PDT-resident fiber-optic transceivers to effectively mimic the coincidence output stream from a real PET gantry. Generally, a final and complete validation of the target PET acquisition system may still require the use of real PET detector arrays; however, because of this Gantry Simulator 100, such use may now be greatly reduced.

The Gantry Simulator PC system 100 according to various embodiments can, thus, provide a general-purpose method to mimic many forms of PET system behavior. Here are some examples of the types of PET data-collection behavior that may be mimicked in a repeated manner, such as being replayed, without continual time on real PET equipment and without continual radiation exposure:

1. Source Decay—e.g. F-18, etc.
2. Phantom Studies with Full Scatter Content—e.g. 20 cm Cylinders, Chest Phantoms, etc.
3. Dynamic Studies.
4. Gated Studies—e.g. Rotating Needle Simulators, Real Patient Studies, etc.
5. Continuous Bed Motion Studies.
6. Time-of-Flight Studies.
7. Accurate Reproduction of Variable Coincidence Rate as Defined by Elapsed Time Tag Packet Content of List-Mode Files—e.g. activation studies, etc.
8. Roughly Accurate Reproduction of Poisson Arrival Statistics.

This Gantry Simulator 100 supports methods (e.g. pseudo-random number generators. redefinition of time-marker tag packets, etc.) which mimic the varying coincidence detection and transmission rates exhibited by the original (real) PET gantry. These methods allow both the biological and half-life determined count rates of the original PET acquisition to be effectively reproduced during fiber-optic retransmission. Not only can the average rate of packet retransmission effectively approximate that of the original "real PET" experience, but the Poisson-distributed (i.e. random) time delays between subsequent packet transmissions can also be mimicked. To accomplish this Poisson-timing mimicry, a field programmable gate array (FPGA) residing on the PDT card 110 may implement, for example, a 29-bit pseudo-random number generator (PRNG). According to other embodiments, different random number generators may be used. The Gantry Simulator PC 100 also allows any particular PET simulation to be precisely repeated indefinitely which is a critically-useful-for debugging feature that is not possible with real isotopes and real PET detectors. In addition, this compact Gantry Simulator PC 100 can be in desktop, tower or any other suitable form and can easily reside in the developer's office if desired, thus, reducing the need to tie up the limited-resource PET/CT hot cell for hours on end.

Figure 2:
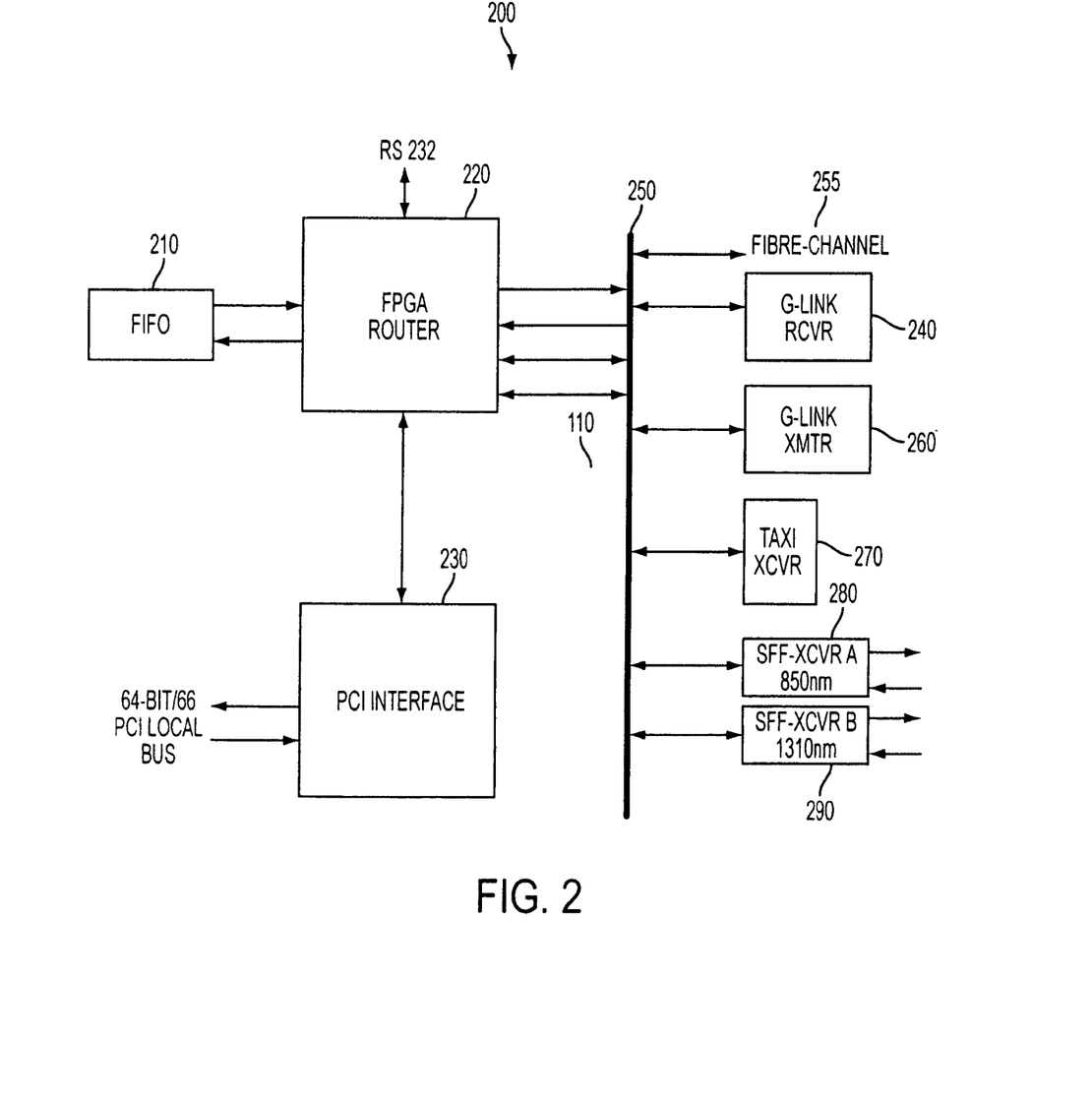
FIG. 2 shows an embodiment of a PETLINK™ direct memory access (DMA) transceiver (PDT) card.

The following will describe the architecture of the PDT card 110. FIG. 2 shows the principal structure 200 of an embodiment of a PDT card 110. The PDT card 110 may be comprised of an FPGA 220, FIFO memory 210 and a PCI interface chip 230. The card may serve as a main switch bus or matrix 250 for performing various PCB cross point switch connections between the following entities: the PCI interface 230 a Fibre Channel interface 255, a G-LINK receiver 240, a G-LINK transmitter 260, and a TAXI transceiver 270. Primary data flow operation of the PDT card 110 when used as a Gantry Simulator takes place between the PCI bus and PCI interface chip 230 (e.g. 64-bit packet inputs at up to 33 MHz), between the PCI interface chip 230 and the Router FPGA 220 (e.g. 64-bit packet loaded at up to 33 MHz), between the Router FPGA 220 and FIFO 210 (e.g. 64-bit packet loaded at up to 33 MHz), between FIFO 210 and the Router FPGA 220 (e.g. 64-bit packet unloaded at up to 26 MHz), and between the Router FPGA 220 and the main switch bus 250 (e.g. 64-bit packet outputs at controlled PET-like rates).

There may also exist an opportunity for this Gantry Simulator PC 100 to help in the area of software development for Gantry Control and Gating Input. To a large extent, the opportunity to invest in software to mimic Gantry behavior for "Gantrytalk" over RS232 or more recently Ethernet has always been present. This PDR-centric proposal for a Gantry Simulator PC should also be fully compatible with any and all requirements for emulating this equally vital software portion (Control, Status, Gating, etc.) of the Gantry behavior. For example, an RS232 port on the Gantry Simulator PC motherboard may be used to output synthetic "gating packets"

Amongst others, the Router FPGA 220 may perform the following basic functions. It can arbitrarily control the rate at which packet data is output over the output interfaces. The packets generally arrive from a list-mode file via the PCI bus. A fixed rate control is achieved by setting a register value via the PCI bus. The FPGA also allows reproduction of the implied packet data rate present in the original PET data acquisition. This original data rate is shown by the elapsed time tag packet content in the list-mode file. The FPGA allows buffering of incoming list-mode PCI packets through the on-board FIFO chip prior to an interface transmission. This helps to ensure higher output packet rates with fewer interruptions. The FPGA also roughly emulates the packet-to-packet delays as occurred during the original PET data collection. Some FPGA circuits provide fully adequate "randomization" of the packet-to-packet delays during interface transmission.

According to an embodiment, the PCI interface chip 230 couples the PDT card 110 with either a 32-bit/33 MHz or 64-bit/66 MHz PCI bus. According to an embodiment, PCI interface chip 230 and the Router FPGA 220 are set to receive via direct memory access (DMA) "real PET" list-mode data as read from a local RAID file. The PDT card 110 also includes PETLINK™-compatible fiber-optic transceivers 280 and 290 as the main output interfaces. These interfaces are set to retransmit this same "real PET" coincidence-packet data to a PET acquisition system 150 under test/development. Further interface chips 255-270 may be present to support both the older PETLINK™ protocols, such as G-LINK and TAXI. The Fibre Channel serial protocol 255 may be supported directly by compatible high-speed SERDES interfaces resident within the Router FPGA 220. The thick, black vertical line 250 in FIG. 2 is intended to loosely represent a form of PCB-component-adjusted cross-point "switch" which has been implemented on the PDT card 110. To a degree, this switch determines which of the desired PET applications are selected for use. According to further enhancements, there may be an RS232 interface and interfaces 280 and 290 may include fiber-optic PETLINK™ receivers, which may not specifically be needed for the Gantry Simulator. However, these other features can be useful for other PET applications.

The heart of this Gantry Simulator concept is the functionality present within the Router FPGA 220. Primarily, this FPGA function controls the average rate of retransmission of real or synthetic PET event and tag packets. Significantly, this FPGA function may also mimic Poisson-like behavior for variable time-delays between re-transmitted packets.

The PDT card 110 may have the following functionalities: A Rate Control Enable (RCE) bit and a Delay Overwrite Enable (DOE) bit are defined in a PCI-accessible register may be defined which is normally set to 0. When the RCE bit is set to 1 (and DOE=0), the Router FPGA uses the content of the DELAY register (also PCI-accessible) to determine a fixed rate of transmission of packets via the designated Fibre Channel (FC) output port. When the DOE bit is set to 1 (along with RCE=1), the "delay overwrite" process is enabled. Here the content of the DELAY register is automatically updated based on the Delay Value (DV) field content of the arriving elapsed-time tag packets. As for RCE=1 & DOE=0 case, the content of the DELAY register is used to determine the rate of event packet transmission on the PDR Fibre Channel output port. The DELAY register width is 29-bits; other bit widths may apply depending on the embodiment. The content of this register controls the time that transpires between the transmission of successive event packets on the designated output ports. A value of zero implies zero delay and may be technically unachievable given the non-zero time required to transmit each packet. A value of 1 implies, for example, that 15.15 ns will elapse between the start of transmission on FC of successive packets which may also be technically unachievable. In practice, these two very low delay value examples (0 & 1) imply higher than achievable rates of packet transmission, for example, beyond the limit of the FC bandwidth capacity of 1 Gbps and 2 Gbps. More realistically, for a rate of 1 M events/sec, the value stored in this register should be exactly 66, and a rate of 1 k event/sec requires a value of 66000. When "delay overwrite" is enabled (—i.e. RCE=0 and DOE=1), the content of this DELAY register is automatically updated by the FPGA router using the 29-bit DV content from the arriving elapsed time tag packets. The default value for this DELAY register is 66 for a corresponding default rate of 1 M event/sec. The user can choose any alternate starting value and simply preload this FPGA register. In accordance with the definition of the DELAY register, a 29-bit DELAY counter may be also implemented in the Router FPGA. The concept is to clock this counter at 66 MHz. As the desired time delay (content of DELAY register) is reached, the next event packet is output by the FPGA. Subsequently, the counter is reused for the next event packet delay. This implies the DELAY register content is used as either a preload (down-counter) or compare (up-counter.) This forced delay may not apply to non-event (tag) packets. All tag packets should be transmitted on the respective output port with minimal delay. The PDT FIFO chip (210) is important to this process. In this Replay application, data are transferred into the PDT's FIFO via DMA over PCI. The Router FPGA unloads the data from this FIFO and transmits them to the FC output port. The reading of the FIFO and subsequent data transfer are governed by the forced delays defined by the delay generation logic. The importance of some diligence to achieve precision is to be noted. For example, there is value in having a delay value of 66 (66000) actually achieve event packet transmission rates that are rather precisely 1 MHz (1 kHz).

For proper handling of elapsed time tag packets, a 29-bit elapsed time increment register may also be defined. The content of this register is used to replace the 29-bit field content of the outgoing elapsed-time tag packets when DOE=1. The content of this register may be automatically incremented by the Router FPGA after each such elapsed time tag packet is transferred to the FC output port. This mechanism provides for removing the "delay overwrite" content of the list-mode file so that the output stream more closely matches the original form—that is, before the elapsed time tag packets were "overwritten" with delay content. The default content for this register can be zero. The user may realize any desired non-zero starting value by writing the desired value into this FPGA register prior to the start of replay. This register and functionality may also be applied when DOE=1. In addition, in order to more correctly support rates below 1 kHz, it may be necessary for the FPGA router to support one more delay timer. This delay timer might be always for 1 millisecond. Whenever an elapsed-time tag packet is transmitted by the FPGA router, this 1 ms delay timer is activated. And then before any elapsed time tag packet is transmitted by the FPGA router, this 1 ms delay timer must first have reached completion. This mechanism can ensure that at least 1 ms will elapse between the transmission of elapsed-time tag packets on the respective output port. If handled properly, this simple mechanism should allow packet-output rate control well below 1 kHz.

The following describes the packet rate control methods. The various techniques described here are employed to provide PET-like rate control over the previously stored and re-transmitted list-mode data and are tailored to match the functional strengths and weaknesses of the Router FPGA 220 on the PDT card 110 and the PC architecture itself. Some critical FPGA-hardware-resident/operating-software-resident tradeoffs may be made to properly match the requirement with the available functionality. For instance, when a real PET coincidence stream is recorded in list-mode for use by the Gantry Simulator, the event packets must be collected in "raw" 64-bit detector-pair format. Also, the elapsed-time tag packets—e.g., those which mark the passing of each millisecond (ms) during the acquisition—must be present.

In the case of controlling the average rate at which coincidence packets are transmitted, the definition and content of the elapsed-time tag packet is specially modified within each list-mode file prior to transfer to the PDT card. This can be accomplished without compromise to the final PDT-transmitted data because, for example, mechanisms are supported which can return the elapsed time tag packets to their original content during retransmission. According to the PETLINK™ protocol, the original intent and definition of a 29-bit "elapsed millisecond" field within the elapsed-time tag packets is to contain simple incrementing values. As a method for transmit-rate control within the Gantry Simulator, this 29-bit fields is "overwritten" to contain one of two temporary values, e.g., values calculated prior to Gantry Simulation run time. This file overwrite can be performed, for example, by a simple C-code utility, thus, eliminating burdensome real-time calculations (e.g. divide and exponent) from the Router FPGA 220. One 29-bit overwrite is a delay value (DV) for rather constant, periodic time delays between transmitted packets. The other is a probability value (PV) for variable Poisson-like time delays between transmitted packets. Other transmission protocols may have a different stricture and, thus, may require different placeholders for these values. First, this simple "overwrite" utility may be employed to modify the file prior to re-transmission. Next, this modified list-mode file is input to the PDT for packet retransmission at controlled rates, thus performing the Gantry Simulation. Depending on the processing power of the FPGA 220, according to another embodiment, the overwrite utility may be omitted and the respective processing performed by the FPGA 220.

The "DV mode" of the PDT card is presented here primarily as a reference. While there are a number of limitations that result from DV mode, this mode is still very useful while being comparatively easy to implement. In DV mode, the Router FPGA on the PDT card realizes a simple delay generator using a binary counter clocked at 66 MHz. The magnitude of the delay is determined by the current DV. As the list-mode file is input to the PDT, the DV may be typically updated every millisecond, e.g., with each arrival of a DV-modified elapsed-time tag packet. For each arriving event packet, the Router FPGA 220 creates a delay, for example, a delay of DV*15.15 ns. Arriving event packets are retransmitted with this time delay held between subsequent packet transmissions. For the current design, the 29-bit DV may be an integer value calculated as:

$$DV = (66\ MHz) * (1\ millisecond)/nep \quad (1)$$

The parameter "nep" (i.e. number of event packets) is the quantity of event packets found by the overwrite utility following each elapsed-time tag packet and before the next elapsed-time tag packet. For example, if a 1 MHz event packet output rate is desired (nep=1000), DV is set to 66. For a 1 kHz event packet output rate (nep=1) DV is 66000. It is understood that this specific DV technique cannot effectively support the transmission of event packets at rates lower than 1 kHz while also preserving the 1 ms retransmission timing of the elapsed-time tag packets. Clinical PET rarely involves such low rates. However, other implementations may allow for a lower rate. The DV mode may have furthermore a limited precision, especially at the high end, e.g., when stepping from a DV of 66 to 65, the resulting MHz event packet output rates change discretely from 1 to 1.015 . . . with no direct way to achieve other rates in between. However, other embodiments may include other hardware that allows for a respective higher resolution in the higher transmission rates. For example, a non linear table may be used wherein DV is used as an index to address the table. The table might define a plurality of common delay values in non-linear fashion. Thus, certain time periods may be higher resolved than other time areas.

According to the above DV-mode technique, there can only be uniform delays between subsequent packet transmissions (i.e. periodic cycling) for a predetermined time-tag interval of 1 ms. It is well known that radioisotopic-induced radiation detection (as in PET) follows a random Poisson distribution for the time intervals observed between event detections. To support that level of subtle emulation of real-PET Poisson behavior, this Gantry Simulator employs a so-called "PV mode."

Figure 3:
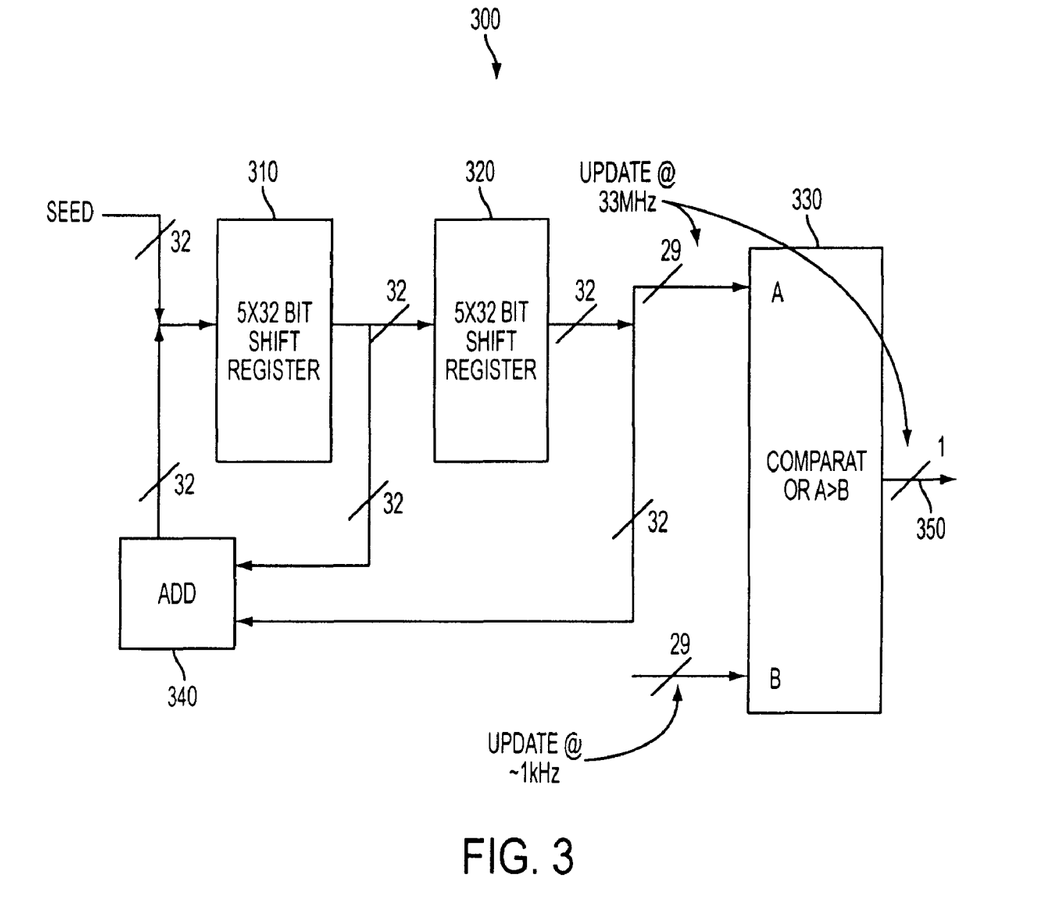
FIG. 3 shows a random number generator and comparator unit that may be implemented in a PDT card.
Figures 4A, 4B:
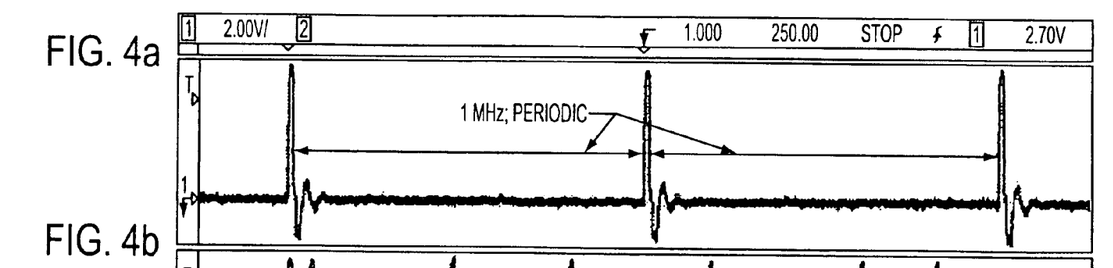
FIG. 4a-e is a diagram showing several traces of a logic pulse stream.
Figure 4C:
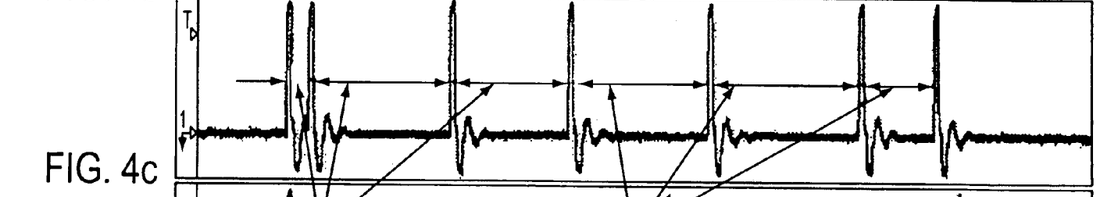
Figure 4D:
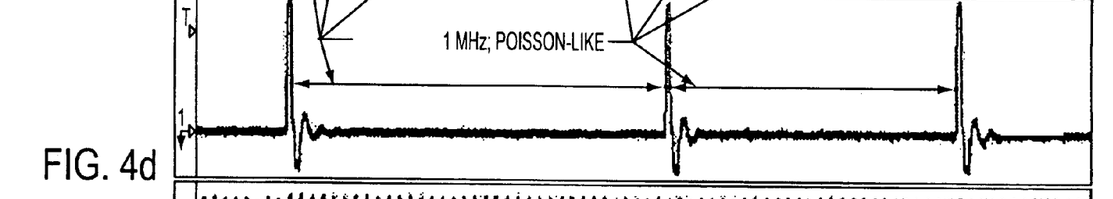
Figure 4E:
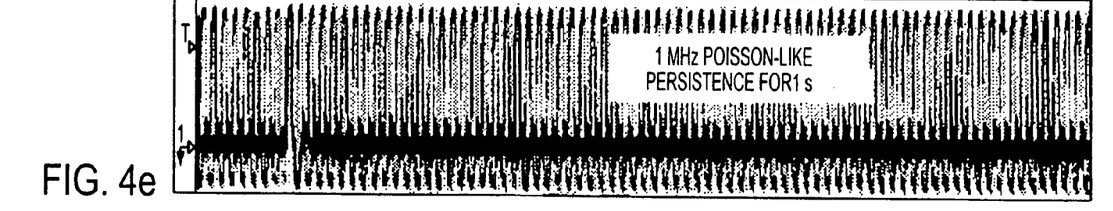

For the case of Poisson timing and prior to gantry simulation, the original list-mode file may be modified by the overwrite utility such that a varying 29-bit "probability value" (PV) is inserted into existing elapsed-time tag packets which occur at 1 ms collection-time intervals throughout the file. At gantry simulation time, this PV-modified list-mode file is transferred to the PDT via the PCI bus. In parallel with this transfer, the Router FPGA 220 employs the pseudorandom number generator (PRNG)/comparator circuit 300 as shown in FIG. 3. The Lagged Fibonacci Pseudo Random Number Generator PRNG circuit 300 (LFG 17, 5, 32) is comprised of a 5×32 bit shift register coupled with a 12×32 bit shift register 320 and an adder 340. The output of the second shift register 320 is fed back to the adder 340 where it is summed with the output of first shift register. The output of the adder is fed back to the input of the first shift register 310. The seed for this PRNG is programmed from the PC via PCI register access. A comparator performing the function A>B receives the 29 bit output of the second register 320 at input A and the value of PV at input B. The PRNG portion (LFG(17,5,32)) of FIG. 3 outputs a 29-bit pseudorandom number (PRN) at the rate of 33 MHz. A simple digital comparator 330 is employed by the FPGA router 220 to generate a single "FIFO-Load" control bit 350. Note that the "B" input (i.e. PV) to the Comparator is updated at roughly 1 kHz by the arriving packet stream. In effect, this FIFO-Load bit controls the rate of event packet re-transmission with the Poisson-like time distribution desired. As with the DV case above, the PDT may not be designed to effectively handle event packet output rates approaching and lower than 1 kHz while also preserving the 1 kHz retransmission timing of the elapsed-time tag packets.

The implementation of this PRNG circuit within the FPGA 220 uses similar control logic as does the DV mode. A mode control bit, PRN, can be defined to distinguish between DV mode and the PRNG mode. When operating in PRNG mode with RCE=1 and DOE=0) the Router FPGA uses the content of the DELAY register (PV) to determine a Poisson-model "fixed" rate of transmission of packets via the respective output port. This means the DV value in the DELAY register is not updated by the incoming list-mode file but remains fixed unless changed by a PCI write access. When DOE=1 and RCE=0, the DOE functionality is enabled. That is, it is presumed that the incoming list-mode data has been prepared to contain "PV overwritten" elapsed-time tag packets. The Router FPGA extracts the 29-bit PV value from the incoming "overwritten" elapsed-time tag packets and loads this PV value into the DELAY register. The Router FPGA 220 applies the content of this register as the PV value—i.e., an input to the comparator 330. The user must preload this register via PCI access to provide any the desired default value for PV. This default value is particularly useful when RCE=1 and DOE=0—that is, when there is a desire to allow Poisson-model behavior for a "fixed", average event rate. Also this register provides a starting PV value during a "overwrite" list-mode replay (RCE=0 & DOE=1) and prior to the arrival of the first "PV overwritten" elapsed-time tag packet. A PCI register write register is also provided such that the application software may fully initialize all seventeen 32-bit values in the PRN generator circuit 300.

The PV integer value is calculated by the overwrite utility according to the number of event packets in the file observed between subsequent time packets by the equation:

$$PV = (2^{29}-1) * (nep * 1\ k/33M)) \quad (2)$$

For example, 643 event packets found implies a 643 kHz event-packet rate for this 1 ms interval. For this same example, PV may be calculated to be $(643*1\ k*(2^{29}-1)/33M)$ or 10460848 (dec). According to another example, if 1000 event packets (nep=1000) are found between subsequent PV-modified elapsed-time tag packets, this implies a 1 MHz event-packet rate for this 1 ms interval. In this case, PV is calculated to be 520602096 (dec). If instead only 1 event packet (nep=1) is found, the indicated rate is 1 kHz and PV=536854642(dec).

Like most real-world systems which involve random time of arrival, the behavior of systems which detect (count) radiation events (such as PET) can be effectively characterized by the Poisson distribution:

$$P = \frac{\lambda^X e^{-\lambda}}{X!} \quad (3)$$

where

P is the probability of detecting radiation events (counts) within a time interval.

λ is the average number of detections (counts) over an interval.

X is the number of counts.

For example, a radiation detector may report a detection rate of 1 M events/sec from a naturally decaying source. Neglecting pile-up losses within the imperfect detector, the probability of encountering no detected events (X=0) within any given 30.3 ns (33 MHz clock) can be calculated as follows. For convenience, λ is defined as the frequency*interval or fi. In this case one is most interested in the single cycle interval of the 33 MHz clock driving the PRNG/comparator circuit 300, i.e. i=1/33 MHz. For this f=1 MHz example, λ=fi=1/33.

$$P_0 = e^{-\lambda} = e^{-f/33M} = e^{-1/33} = 0.97001 \quad (4)$$

The probability of one or more events encountered, i.e. never zero:

$$P_{\geq 1} = 1 - P_0 = 1 - e^{-f/33} = 0.0298 \quad (5)$$

By contrast, the PRNG/Comparator circuit 300 behavior may be characterized by the binomial distribution $$B = \frac{N!}{X!(N-X)!} p^X q^{N-X} \quad (6)$$

where
B is the probability of detecting a number events (counts) within a number of trials.
X is the number of counts.
N is the number of trials.
p is the probability of 1 count in a single trial.
q is the probability of no counts in a single trial.

For the case of a 1 MHz single event detected during the 30.3 ns cycle of the PRNG/Comparator circuit 300, the binomial distribution uses the following parameters:
X=1 (one successful trial or count)
N=1 (One trial or one 33 MHz clock cycle)
p=1 MHz/33 MHz (For trial success rate of 1 MHz)
q=1−(1 MHz/33 MHz)

For this example, the binomial distribution simplifies to the "single trial" case. In the single trial case p=λ=fi. Specifically here, f=1 MHz and generally i=1/33 MHz. Also it is to be noted that there can never be more than one count per each 33 MHz clock cycle of the PRNG/Comparator circuit 300. This means that the probability of one count equals the probability of one or more counts, i.e. $B_1 = B_{\geq 1}$.

$$B_{\geq 1} = \frac{l!}{l!(l-1)!} p^l q^{l-1} = p = f/33 \text{ MHz} = 0.0303 \quad (7)$$

Figure 6:
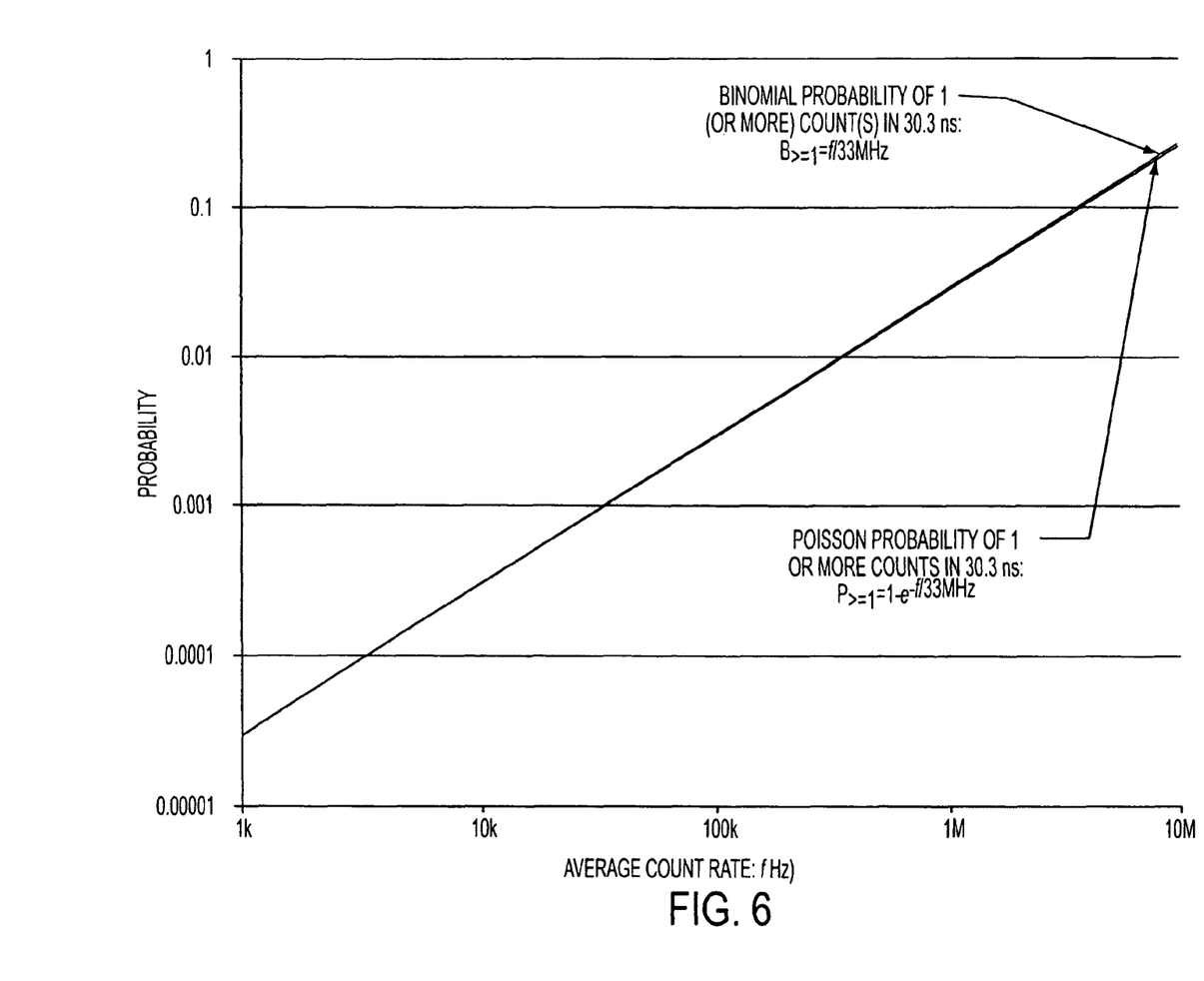
FIG. 6 shows in a log-log comparison plot the Poisson versus binomial distribution probabilities.

FIG. 6 shows in a log-log comparison plot the Poisson versus binomial distribution probabilities. The Poisson curve plots the probability of 1 or more counts observed within 30.3 ns versus the average count rate. The binomial curve also plots the probability of 1 (or more) count(s) observed within 30.3 ns versus rate. These closely matching plots demonstrate that the PRNG/Comparator circuit 300 can very effectively mimic the random arrival timing of counts for radiation detection system in these instances. With this analysis and the results shown in FIG. 6, the desired Poisson distribution is very closely approximated by the binomial distribution of the PRNG/Comparator according to various embodiments.

FIG. 4 is a composite of several trace captures of a logic pulse stream using a digital oscilloscope. FIG. 4 thus shows traces of DV and PV timing behavior. All pulse streams shown have an average rate of 1 MHz. The rising edge of the 15 ns pulses indicates a "load 64-bit packet into PDT FIFO" control by the Router FPGA 220. At top (a) is the legend from the oscilloscope screen. Next is trace (b), for the PDT in DV mode shows periodic pulses as a reference repeating in 1 microsecond intervals. Traces (c, d, and e) for the PDT in PV mode show that each rising edge corresponds to the "FIFO-Load Bit" of FIG. 3 which indicates one 64-bit packet load per rising edge. Traces (c, d) show two randomly chosen single trigger examples of the pulse stream. The variation of delay between PV-mode pulses in (c, d) and DV-mode periodicity of trace (b) can be clearly seen. Trace (e) is similar to traces (c, d) except that the oscilloscope is set in "persistence" mode. For the bottom (4.e) trace, all 30.3 ns (33 MHz clock) opportunities for a rising edge across the full width of the trace show pulse content. This "all-filled-in" content of the persistence portion of 4.e is a partial confirmation of the Poisson-like functionality of the PRNG/Comparator circuit 300. Thus, (e) captures traces through multiple triggers. The lighter grey content in (e) "persists" across the many oscilloscope triggers during a 1 second run.

Figure 5:
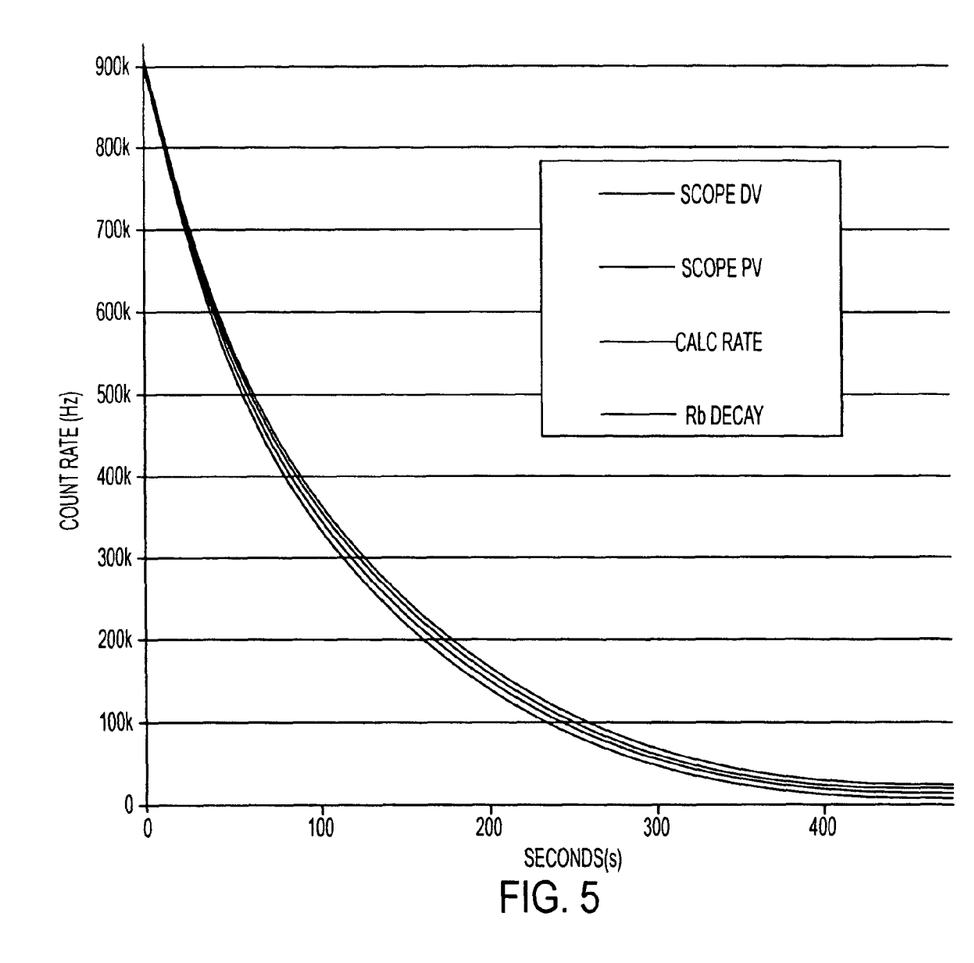
FIG. 5 shows the agreement of the count rates between the expected and measured results of a Gantry Simulator retransmission of "real-PET" data.

FIG. 5 shows the close agreement among 4 representations of an actual PET study using Rb-82. This plot shows good, first-pass agreement of the count rates between the expected and measured results of a Gantry Simulator retransmission of "real-PET" data. In FIG. 5, the Gantry Simulator output count rate is compared four ways. This plot contains data from 4 sources. Three of the plots are directly from a "real-PET" Rb-82 64-bit list-mode acquisition to a file. Of these, two (Scope DV & Scope PV) are the analog output of a NIM rate meter (TC525) during Gantry Simulator re-transmission of this file. A "FIFO-Unload" logic signal drives the rate meter from the PDT, e.g. with one rising edge for each 64-bit packet unloaded from the FIFO. The third (Calc Rate) is calculated from the list-mode file content itself. The fourth plot (Rb Decay) is a simple calculation of exponential decay with half-life of 75.48 seconds. No compensation was made for detector dead time nor were trues (prompt−delayeds) rates presented uniformly. The two "Scope" plots represent total packet rates, i.e. prompts+delayeds+tags. The "Calc rate" plot represents total event packet rates. i.e. prompts+delayeds. Only the "Rb Decay" plot represents true packet rates. Even so, the generally close agreement among these 4 plots is a good validation of the Gantry Simulator performance.

In addition, other initial evaluations show good results. In general, excellent agreement (>99.99%) between the expected average rate of Gantry Simulator retransmission (for both DV and PV modes) and the actual average rate is observed from 1 kHz to well above 1 MHz. In many instances, agreement on rates up to 4 MHz and 8 MHz are very good and may be limited primarily by less-than-ideal slower mass storage systems.

Also, preliminary trials show excellent file-against-file matching between the Gantry Simulator retransmission and retransmission-fed PET data acquisition. At this point several billion packets have been retransmitted and collected for packet rates up to 1 MHz. Ignoring minor collection problems which may account for 15 errors out of 64-90M due to scant end-of-file issues, this means the original file matches the collected-during-retransmission file exactly across dozens of trials. Matching trials with transmission rates above 1 MHz are promising with several successes out to 4 MHz. This success comes even though RAID with less-than optimal speed, for example, using a RAID with 2-disk versus 4-disk Re-transmission of "real-PET" packets at rates that mimic original "real-PET" detection can been demonstrated with an inexpensive Gantry Simulator PC system with PDT card according to various embodiments. Rates as high as 1 MHz and higher have been reported for both the DV (periodic time-delay distributions) and PV (Poisson time-delay distributions) cases. Theoretical analysis indicates good agreement between the binomial-distribution-dominated PRNG/Comparator circuit and the desired Poisson distribution of PET detectors. Results confirm the Poisson-like time delays between event packet re-transmissions. Also, "real-PET" list mode data was collected using Rb-82 and retransmitted with a good mimicry of the expected Rb-82 half-life. Excellent reproducibility of data handling (file matching) and good agreement of expected and measured count rates were reported.

According to some specific embodiments, the respectively employed techniques may not effectively support the transmission of event and tag packets at packet rates lower than 1 kHz, but such low rates are unusual for clinical PET. It is also understood that the some embodiments of the Gantry Simulator technique may be limited in that changes to the average event-packet output rate cannot (typically) be updated faster than once every millisecond. However, there is more than a little potential for this Gantry Simulation system to reduce the time burden on the much more expensive PET detector arrays and to reduce the personnel source-handling burden, e.g., for factory testing and development of PET data acquisition systems. This Gantry Simulator system has already helped in the validation and debugging of existing PET systems. The development of new systems will therefore be easier and less costly. More work can be done to evaluate the Gantry Simulator at higher retransmission rates depending on the speed of the mass storage system such as the installed RAID system.

In summary, the proposed system may provide for the following benefits:

New acquisition systems coming on line from R&D with much higher levels of validation prior to production and human trials. More extensive and more realistic testing in the developer's office is possible with a local inexpensive Simulator PC instead of making heavy use of hot cells well away from the developer's desk or bench.

New (and even older) acquisition systems in production that may be tested more easily and more thoroughly and with a lower expense due a greatly reduced time required on real PET equipment. Real PET coincidence data, previously collected from a single acquisition, may be replayed multiple times at realistic rates without further source handling or taking repeated production time on expensive PET/CT equipment.

Off-Site contract manufacturing for acquisition systems is made more effective due to an affordable off-site test fixture (Gantry Simulator PC) than closely mimics the expected nature of the various PET applications to come. Eventually, the acquisition system in production may be drop-shipped with confidence directly to the customer from the contract manufacturer avoiding the costly step of first shipping back to the manufacturer/developer for "real PET" testing/validation.

Figure 7:
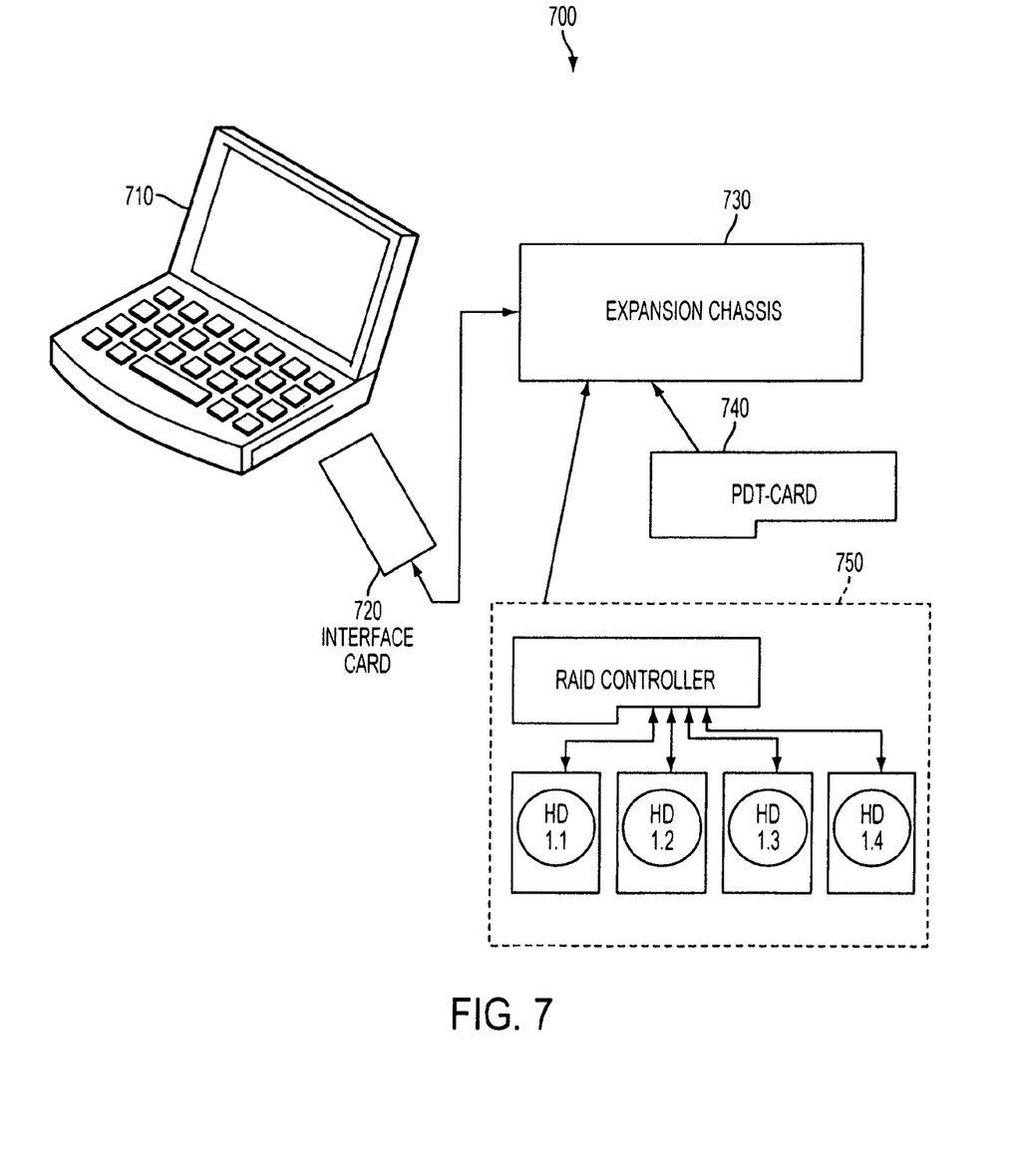
FIG. 7 shows another embodiment of a transportable PET gantry simulating computer system.

According to yet another embodiment the Gantry Simulator PC and its functionality may be put into physically smaller, more-convenient sizes by using a laptop computer system 700 instead of a server size PC as shown in FIG. 7. The laptop computer 710 may be equipped with an appropriate interface card 720 coupling the laptop 710 to an expansion chassis 730 which contains the PDT card 740. To this end, PDT card 740 may have a different interface depending on interface card 720. PCI extension interface cards are, however, readily available. Service personnel are much more likely to make use of such equipment that they actually can tolerate for travel to the customer site on a regular basis. This alternate version of the Gantry Simulator system 700 may, thus, have a physically smaller size. With such tools frequently in the hands of field service personnel, the ability to diagnose and fault isolate problems within different PET products will be greatly enhanced. There is more than one reason to expect that such a small-form factor system will also be lower in cost than the full-size server PC version which makes use of the PDT card. With a regulation-PCI-sized PDT (PETLINK™ DMA Transceiver) card 740, more convenient and cost effective configurations are feasible for the Gantry Simulator PC functionality. The dotted box 750 in FIG. 7 shows that the expansion chassis may also carry an additional RAID system. As hard disks, in particular solid state hard disks, get smaller this might not significantly increase the size of the system. Moreover, the RAID proper may be placed externally in an additional chassis. It is to be noted that some modern laptops already incorporate a fast internal RAID system—likely eliminating the need for an external RAID.

In other possible configurations, a small-form factor Gantry Simulator system 700 using a different interface as implemented on the PDT card 740 may allow for service of other products which use for example Fibre Channel fiber optics exclusively for PET coincidence stream data flow. Such systems may also collect PET stream output from the Coincidence Processor, e.g. simple "List-Mode Only Data Acquisition."

The invention, therefore, is well adapted to carry out the objects and attain the ends and advantages mentioned, as well as others inherent therein. While the invention has been described and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. System for simulating a Positron Emission Tomography (PET) gantry, comprising:
    a computer system having a bus system for receiving expansion cards;
    a mass data storage support system, the mass storage system being operable to store coincidence-event and tag packet data; and
    a data transfer simulation card for said bus system, wherein the data transfer simulation card is operable to simulate transfer timing of said stored coincidence-event and tag packet data
    wherein the data transfer simulation card comprises a field programmable gate array (FPGA) programmed to operate as a router
    wherein the data transfer simulation card further comprises a FIFO buffer coupled with said FPGA router and a bus system interface circuit coupled to said FPGA router.

2. The system according to claim 1, wherein the mass data storage support system is a redundant array of inexpensive disks (RAID).

3. The system according to claim 1, wherein the mass storage system comprises one or more solid state hard disk.

4. The system according to claim 1, wherein the data transfer simulation card comprises an output interface selected from the group consisting of Fibre Channel, G-LINK, TAXI, and fiber optic transceivers.

5. The system according to claim 4, wherein the fiber optical transceivers form a PETLINK™ interface.

6. The system according to claim 1, wherein the bus system is a PCI bus.

7. The system according to claim 1, further comprising a cross-point switch coupled between an output interface and said FPGA router.

8. The system according to claim 1, further comprising a trigger system that initiates a periodic stored coincidence-event and tag packet data.

9. The system according to claim 1, wherein the data transfer simulation card further comprises a pseudo-random number generator and a comparator for comparing a random number with a probability value.

10. The system according to claim 9, wherein the comparator generates an output signal that triggers a stored coincidence-event and tag packet data.

11. The system according to claim 1, wherein the computer system is selected from the group consisting of personal computer (PC), server PC, laptop computer.

12. A system for simulating the data output of a Positron Emission Tomography (PET) gantry, comprising:
   a mass data storage system for storing coincidence-event and tag packet data;
   means for reading said coincidence-event and tag packet data; and
   means for outputting said coincidence-event and tag packet data via a selected output interface using a pre-selected timing characteristic.

13. The system according to claim 12, wherein the pre-selected timing characteristic uses a pre-selected delay value.

14. The system according to claim 12, wherein the pre-selected timing characteristic uses a varying probability value for packet delays.

15. The system according to claim 14, wherein the varying probability value is generated by a pseudo-random number generator (PRNG).

16. The system according to claim 15, wherein the PRNG simulates a Poisson timing by a Lagged Fibonacci Pseudo Random Number Generator.

17. The system according to claim 12, wherein the coincidence-event and tag packet data comprise a data field for an elapsed time tag packet.

18. The system according to claim 12, wherein the coincidence-event and tag packet data are output by a field programmable gate array (FPGA).

* * * * *